US010628702B1

(12) United States Patent
Gerstner et al.

(10) Patent No.: US 10,628,702 B1
(45) Date of Patent: Apr. 21, 2020

(54) METHOD OF MATCHING A QUERY IMAGE TO A TEMPLATE IMAGE AND EXTRACTING INFORMATION FROM THE QUERY IMAGE

(71) Applicant: The Government of the United States as represented by the Director, National Security Agency, Fort George G. Meade, MD (US)

(72) Inventors: Candice R. Gerstner, Columbia, MD (US); Katelyn J. Meixner, Columbia, MD (US)

(73) Assignee: Government of the United States as represented by Director, National Security Agency

( * ) Notice: Subject to any disclaimer, the term of this patent is extended or adjusted under 35 U.S.C. 154(b) by 56 days.

(21) Appl. No.: 15/716,902

(22) Filed: Sep. 27, 2017

(51) Int. Cl.
| G06K 9/62 | (2006.01) |
| G06K 9/00 | (2006.01) |
| G06K 9/46 | (2006.01) |
| G06F 40/40 | (2020.01) |

(52) U.S. Cl.
CPC .......... G06K 9/6202 (2013.01); G06F 40/40 (2020.01); G06K 9/00463 (2013.01); G06K 9/00483 (2013.01); G06K 9/4671 (2013.01)

(58) Field of Classification Search
CPC ............ G06K 9/6202; G06K 9/00463; G06K 9/00483; G06K 9/4671; G06F 40/40
See application file for complete search history.

(56) References Cited

U.S. PATENT DOCUMENTS

| 6,400,845 B1 | 6/2002 | Volino |
| 6,886,136 B1 | 4/2005 | Zlotnick et al. |
| 2016/0012311 A1* | 1/2016 | Romanik ............. G06K 9/6203 382/201 |
| 2016/0148074 A1* | 5/2016 | Jean .................... G06F 16/5838 382/190 |
| 2017/0076070 A1* | 3/2017 | Bridges .................. G06F 19/00 |
| 2019/0213437 A1* | 7/2019 | Baumela Molina ........................ G06K 9/00664 |

* cited by examiner

*Primary Examiner* — Jon Chang

(57) ABSTRACT

A template image of a form document is processed to identify alignment regions used to match a query image to the template image and processing regions to identify areas from which information is to be extracted. Processing of the template image includes the identification of a set of meaningful template vectors. A query image is processed to determine meaningful query vectors. The meaningful template vectors are compared with the meaningful query vectors to determine whether the format of the template and query images match. Upon achievement of a match, a homography between the images is determined. In the event a homography threshold has been met, information is extracted from the query image.

22 Claims, 9 Drawing Sheets

METHOD OF MATCHING A QUERY IMAGE TO A TEMPLATE IMAGE AND EXTRACTING INFORMATION FROM THE QUERY IMAGE

FIELD OF THE INVENTION

This invention is generally directed to a method of matching a query image to a template image and extracting information from the query image.

BACKGROUND OF THE INVENTION

Many documents are created following a prescribed format/structure. Examples of these types/forms of documents include government issued identification cards, birth certificates, job applications, driver's licenses, employee identification cards, insurance cards, merchandise receipts, accounting reports, etc. and may generally be referred to as form documents. Many organizations presented with these form documents desire to gather the information presented in the form document for later use. For example, a doctor's office will often request to inspect a patient's insurance card to retrieve information regarding the patient's insurance provider, policy number, etc. The gathering of this information often requires manual re-entry of the information into a database where the information can be retrieved at the appropriate time. Alternatively, the office may produce an image of the insurance card so that if additional information is required, the image may later be referenced to obtain the information. Without entering the information presented on the card into a database, however, the information has limited usability. For example, if the doctor's office desires to identify all patients using a particular insurance policy, unless this information was previously manually entered into the database, all insurance card images would need to be manually reviewed to determine which patients utilized the policy in question. Thus, there is a need for a device and method which provides the ability to collect information from a form document in an efficient and accurate manner.

Prior attempts to automate the collection of information from images provide for matching query images with the template images associated to the same document type/form in order to identify the location of the information to be extracted from the query image. Each of these methods requires processing template images of the desired type/form before the matching of the template image with the query image and extraction of information from the query image can be achieved. U.S. Pat. No. 6,886,136 to Zlotnick describes a process wherein fifty samples of a particular template image are used to create a template file suitable for attempting matches of the template file to the query image. More specifically, the process described by Zlotnick includes summing of information obtained from each of fifty sample template images associated with a particular document type/form. This summation is then used to create a template file associated with the particular document type/form. A problem with this approach is that often fifty sample images for a particular document type/form are not available and in many instances, only a single image is available for a particular document type/form.

Other methods require that the document type/form has specific features. For example, U.S. Pat. No. 6,400,845 to Volino identifies horizontal and vertical lines within a "master" document to provide registration data. When horizontal and vertical lines of the scanned image match the registration data, the scanned image is considered a match. A disadvantage of this method is that at times the template image may not have horizontal and/or vertical lines which can be used to create the registration data. In other scenarios, such horizontal and vertical lines are not sufficiently distinct to identify a proper match between the template image and the query image.

A need exists therefore to provide a method for matching template images and query images without requiring a large volume of template images and without requiring that the template image include certain characteristics.

SUMMARY OF THE INVENTION

Briefly, the present invention discloses a method of matching a query image to a template image and extracting information from the query image. A template image is processed to determine the location of processing identifiers that identify the regions of the template image from which information is to be extracted. The location of these processing identifiers is provided in a parameters file related to the template image. Alignment regions of the template image are also identified along with a set of meaningful template vectors. A query image is processed and a set of meaningful query vectors is defined. The template vectors and the query vectors are compared to provide a set of paired vectors. If the set of paired vectors is sufficiently large, a homography is calculated. The determinant of the homography is calculated along with the inlier key points to determine whether homography thresholds are met. If the homography thresholds are met, the template and query images are determined to be a match. With a match established, the location identifiers of the parameters file are used to identify the processing regions of the query image. Region-specific processing steps are performed on the processing regions of the query image and information is extracted from the processing regions.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 1A:
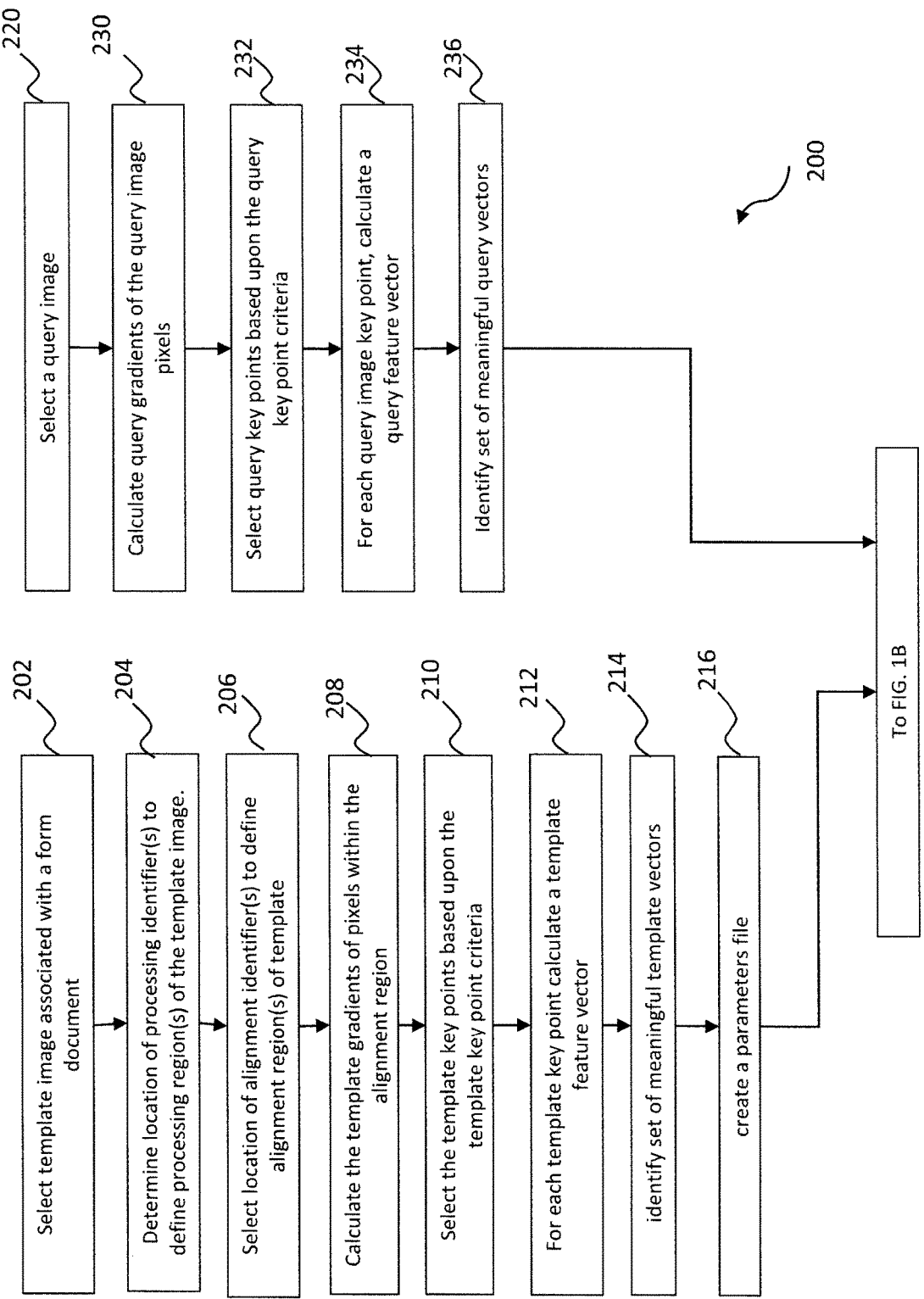
FIG. 1A illustrates the steps of the present invention relating to processing template and query images.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 1B:
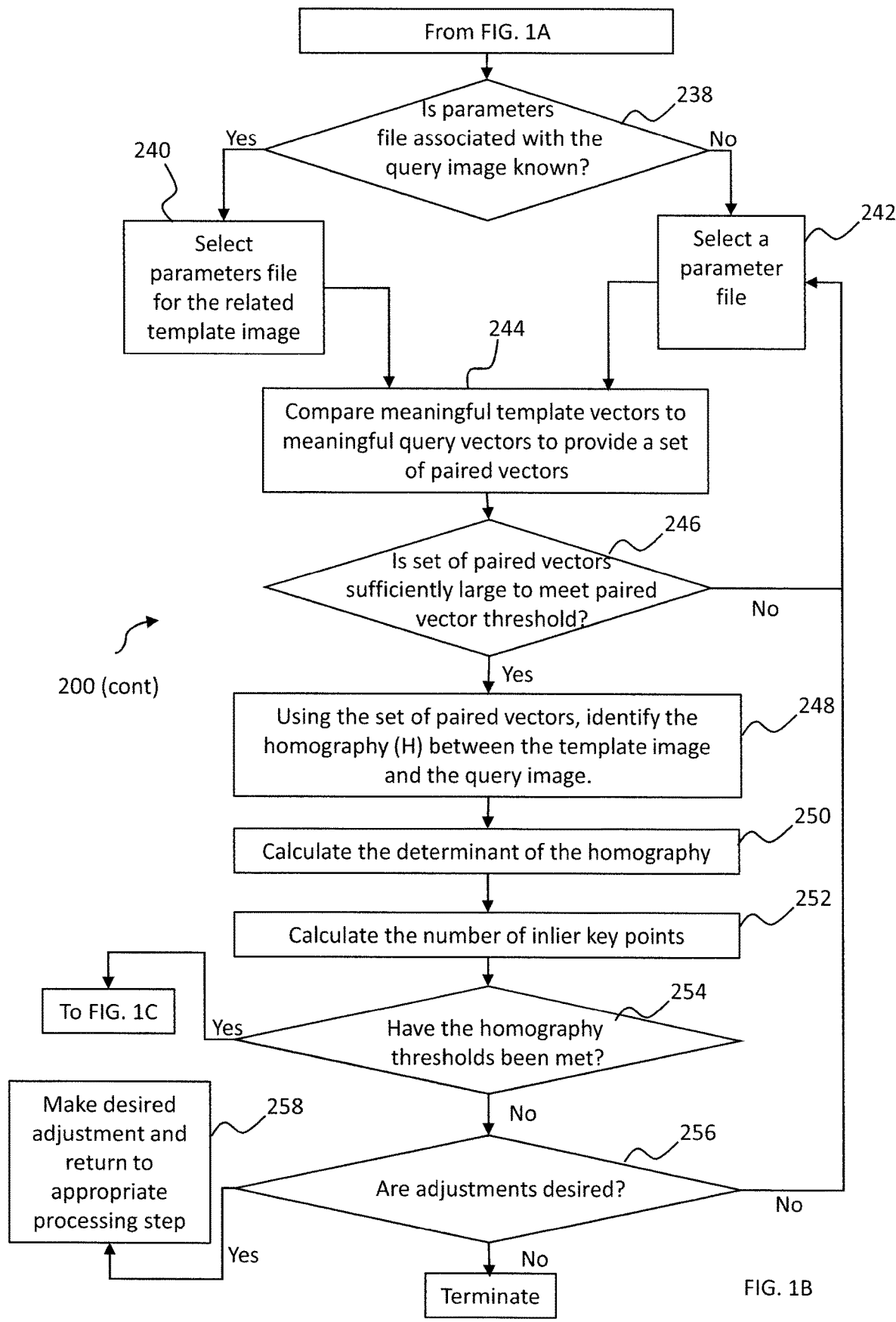
FIG. 1B illustrates the steps of the present invention relating to matching template and query images.
Figure 1C:
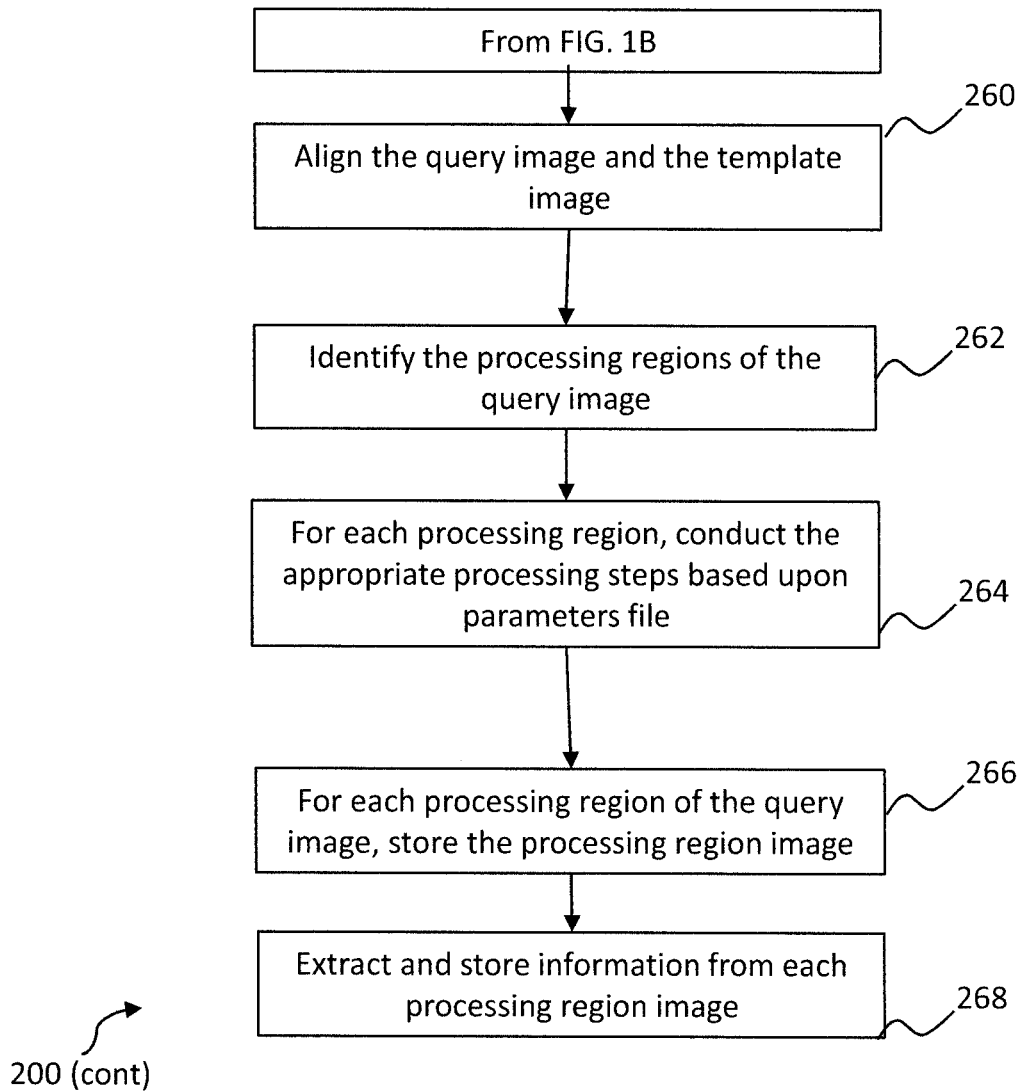
FIG. 1C illustrates the steps of the present invention relating to extracting information from the query images.

FIGS. 1A-1C illustrate a process 200 for obtaining information from a query image associated with a document type/form. Specifically, FIG. 1A illustrates the steps of the present invention relating to processing template images and query images; FIG. 1B illustrates the steps of the present invention relating to matching template images and query images; and FIG. 1C illustrates the steps of the present invention relating to extracting information from query images.

The steps 202-216 associated with processing a template image are illustrated in FIG. 1A. A template image is an image associated with a form document, i.e. a document having a particular format or structure which is used repeatedly. For example a template image may be provided for form documents issued by a governmental body such as a driver's license, identification card, passport or birth certificate. Template images may also relate to form documents issued by private organizations, for example, a retail store receipt, an invoice, an employee identification card, or a standard report. As illustrated in FIG. 1A, processing of a template image begins at step 202 by selecting a template image. Each template image may be provided in any desired color space, e.g., in color or grayscale.

Figure 2A:
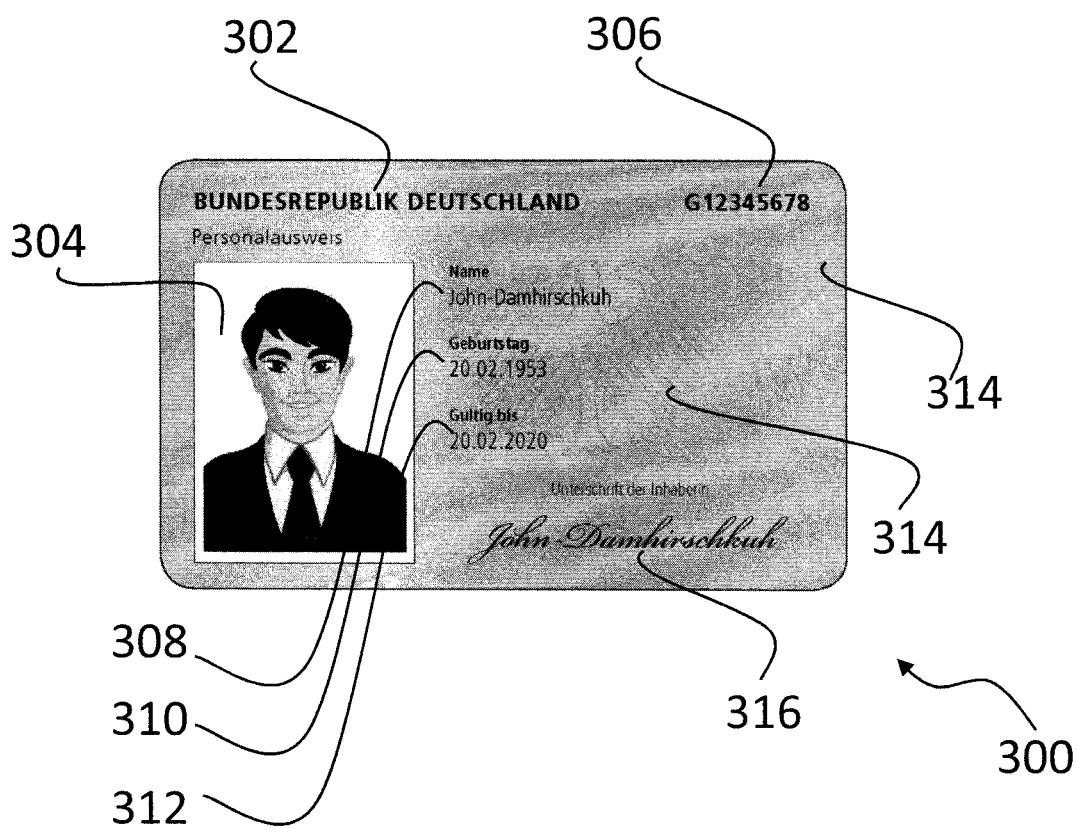
FIG. 2A illustrates an example of a template image in the form of a German identification card.
Figure 2B:
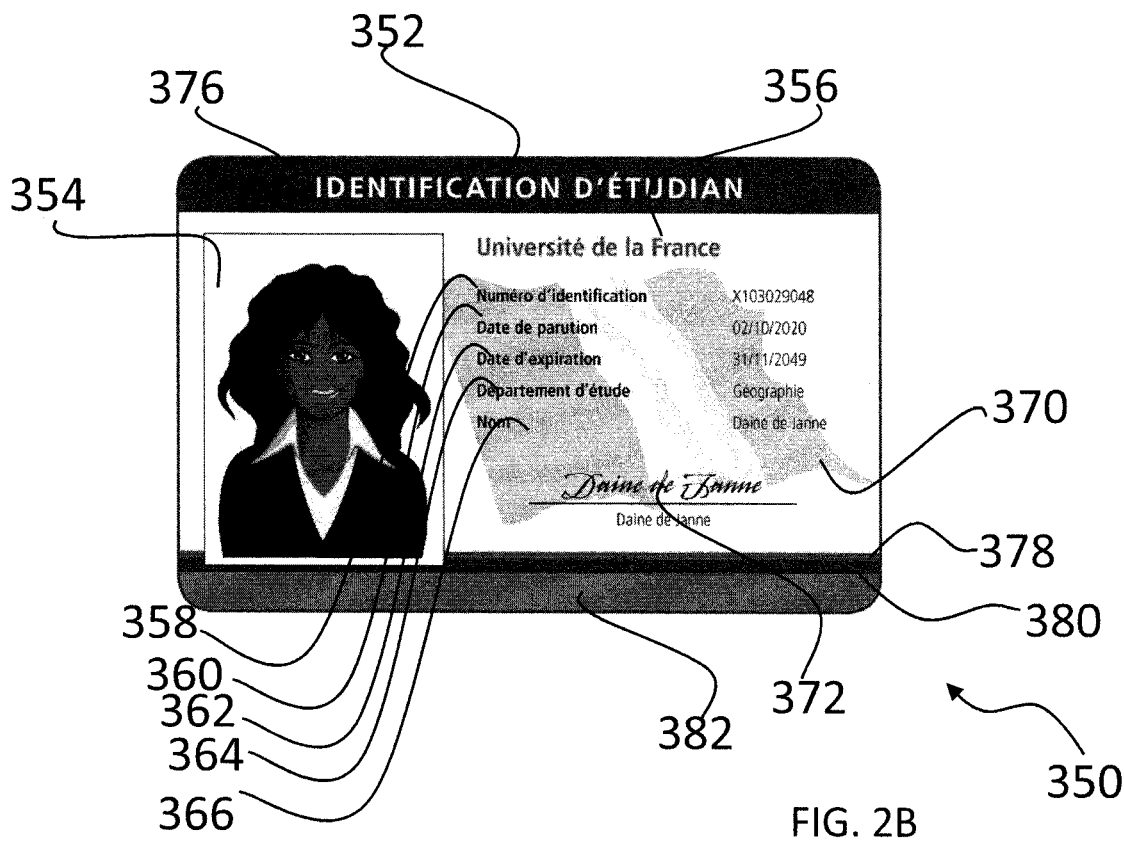
FIG. 2B illustrates an example of a template image in the form of a French student identification card.

Sample template images are illustrated in FIGS. 2A and 2B. Although the invention provides for use of color, black and white, or grayscale template images, for purposes of this description, all images have been converted to black and white or grayscale. Each template image provides a format/structure which is repeated for each document of the same type/format. FIG. 2A, for example, is an image 300 of a German identification card. The German identification card 300 is a form document in which the format/structure of the identification card is repeated for all documents of this type (e.g., German identification cards issued to other individuals). More specifically, the identification card provides a title 302 identifying the governmental body which issued the identification card (i.e. "Bundesrepublik Deutschland") at the upper left corner of the card; a photograph 304 of an individual on the left side of the card; a unique identification number 306 in the upper right corner; and name, date of birth and expiration date field identifiers 308, 310, 312 to the right of the photograph. Identification specific field information is provided beneath each of these identifiers. In addition, a watermark 314 is provided. The watermark includes a centrally positioned eagle and portions of two spheres along the right edge of the document. A signature 316 is also provided under the field identifier for the signature of the card holder. Although the information presented on the identification card is customized for the holder of the card, the format in which the information is presented remains the same. For example, the position and size of the photograph and the position and size of the fields; and the position and size of the watermark are repeated for all identification cards of this type. Preferably, the image used as a template is of high quality resolution and is not rotated or askew.

FIG. 2B provides another example of a template image. More specifically, FIG. 2B illustrates a French student identification card 350. As with the German identification card of FIG. 2A, the French identification card 350 provides a format which is repeated for identification cards of this type. The identification card includes a title 352 centered at the top of the card and identifying the card as a French student identification card; a photograph 354 of an individual on the left side of the card; the name of the school 356 which the student is associated with and fields for identification number 358, date of issue 360, date of expiration 362, department of study 364; and name 366 are aligned to the right of the photograph with entries for each field provided to the right of the field name. A watermark 370 including an image of a flag is provided along with the previously described fields. A signature 372 is provided below the fields 358-366. Although shown in FIG. 2B in grayscale, the template image includes colored bands at the top and bottom of the identification card. Specifically a wide dark blue band 376 is provided at the top of the card and narrow red and dark blue bands 378, 380 are provided a lower edge of the card along with a wide light blue band 382.

Figure 3A:
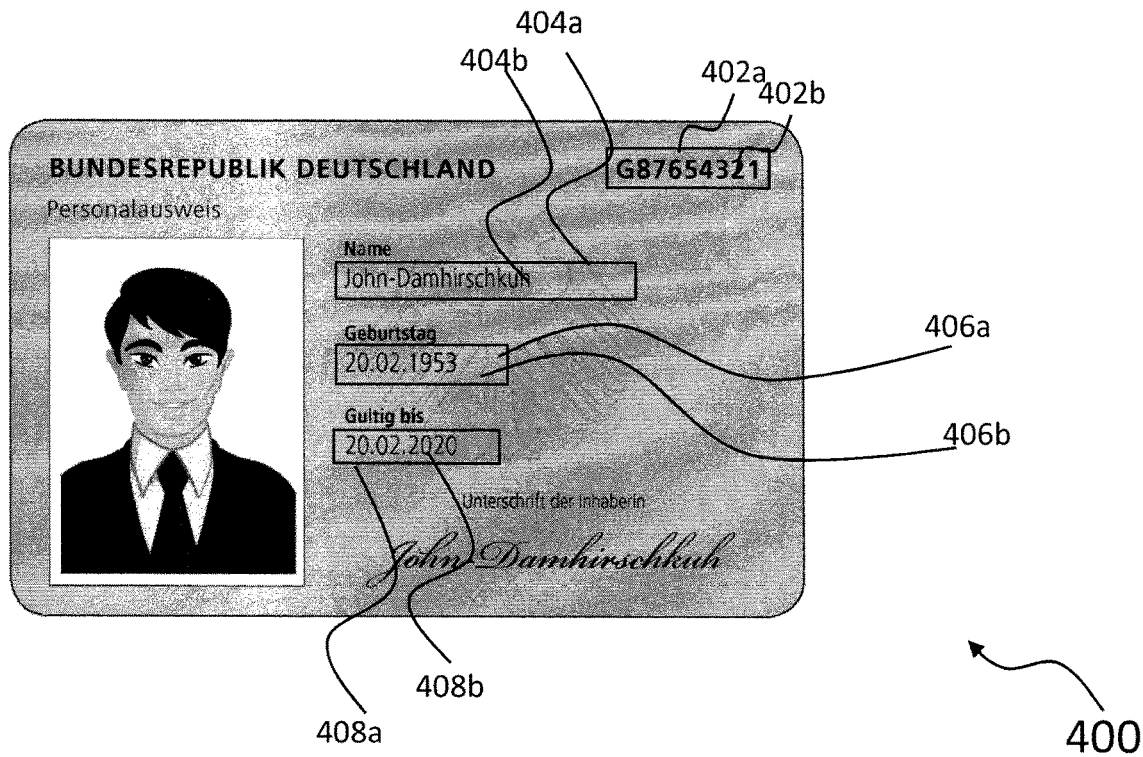
FIG. 3A illustrates a portion of a user interface for identifying processing regions using processing identifiers.

Processing of the template image proceeds at step 204 with determining the location of the processing regions of the template image. The processing regions are areas in the template image where relevant information may be extracted. Processing identifiers identify the physical location of the processing regions within the template image. FIG. 3A illustrates a portion 400 of a user interface of the present invention which aids the user in defining the location of the processing identifiers. The template image 300 of FIG. 2A is illustrated in FIG. 3A along with processing identifiers 402a, 404a, 406a, and 408a and associated processing regions 402b, 404b, 406b and 408b have been identified. Although not shown, the user interface further includes instructions directing the user to identify the location of the processing identifiers. In the example shown, the processing identifiers are provided in the form of bounding boxes 402a, 404a, 406a, and 408a. Specifically, each bounding box is created by using a mouse to indicate an upper left corner, an upper right corner and a lower left corner of the box. The user interface may present the user with the following sequence of instructions, for example: (1) click to indicate the location of the upper left corner of the bounding box; (2) click to indicate the location of the upper right corner of the bounding box; and (3) click to indicate the location of the lower right corner of the bounding box. Alternatively, the user interface may present the user with instructions to indicate diagonally positioned corners of the bounding box. In response to the user input, the user interface displays each bounding box on the template image to provide a visual confirmation that the processing identifier defines a region which includes the desired information to be extracted. Although, bounding box type processing identifiers have been illustrated, it is to be understood that other forms of processing identifiers may be utilized without departing from the scope of the invention. For example, a processing identifier could be circularly-shaped. The user interface could instruct the user to identify a center point and the radius for the processing region and a circle indicating the location of the processing identifier could be displayed by the user interface to provide visual confirmation of the processing identifier. Alternatively still, the user interface could simply request that the user input coordinates representing the corners of a bounding box or the vertices of a polygon.

The area within each processing identifier is a processing region and includes information the user desires to extract from the form document. As illustrated in FIG. 3A, the user interface was used to define the processing identifiers 402a, 404a, 406a, and 408a which in turn identify the respective processing regions 402b, 404b, 406b, and 408b. The information intended to be extracted from the form document 300 therefore includes the identification card number from processing region 402b, the name from processing region 404b, the birthdate from processing region 406b and the expiration date from processing region 408b. Although FIG. 3A illustrates an example in which text is to be recovered from the processing regions, additional types of information may be recovered as well, including for example, bar codes, other two-dimensional codes (e.g., a QR code), photographs, graphical designs, etc. As each processing identifier is defined, the user interface may request additional information about the processing region. Specifically, the type of characters expected within the region may be identified. For example, regions 406b and 408b may be identified as "date" fields and region 404b may be identified as a "name" field.

Figure 3B:
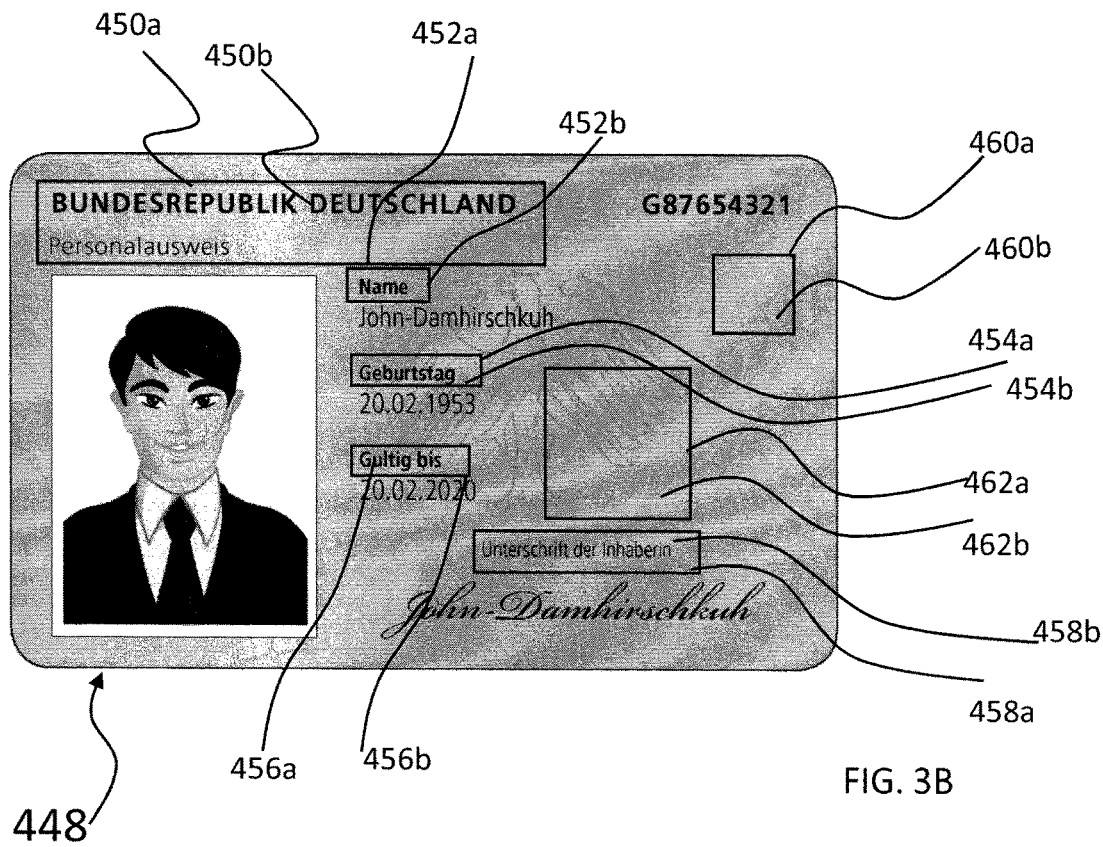
FIG. 3B illustrates a portion of a user interface for identifying alignment regions using alignment identifiers.

As illustrated in FIG. 1A, processing of the template image continues at step 206 where the location of alignment regions of the template image are selected. The alignment regions of the template image are selected based upon their inclusion of characteristics suitable for assisting in aligning a query image with the template image. Alignment identifiers identify the location of the alignment regions within the template image. FIG. 3B illustrates a portion 448 of a user interface of the present invention which aids the user in defining the location of the alignment identifiers. The template image 300 of FIG. 2A is illustrated in FIG. 3B along with alignment identifiers 450a, 452a, 454a, 456a, 458a, 460a and 462a and associated alignment regions 450b, 452b, 454b, 456b, 458b, 460b and 462b. Although, not shown, the user interface further includes instructions directing the user to select the location of the alignment identifiers. In the example shown, the alignment identifiers are provided in the form of bounding boxes 450a, 452a, 454a, 456a, 458a, 460a and 462a. Specifically, each bounding box is created using a mouse to indicate an upper left corner, an upper right corner and a lower left corner of the box. In response, the user interface displays each bounding box on the template image to provide a visual confirmation of the location of the alignment identifier to ensure the desired alignment feature is captured in the alignment identifier. Although, bounding box type alignment identifiers have been illustrated, it is to be understood that other forms of alignment identifiers may be utilized without departing from the scope of the invention. For example, an alignment identifier could be circularly-shaped. The user interface could instruct the user to identify the center point and the radius for the alignment region and a circle indicating the location of alignment identifier could be displayed by the user interface to provide visual confirmation of the alignment identifier.

The area within each alignment identifier is an alignment region. As noted above, the alignment regions are identified and selected based upon their inclusion of characteristics suitable for assisting in aligning a query image with the template image. Generally, regions of the form document are selected to serve as alignment regions because they provide a feature which is repeated for all documents utilizing this form and at the same time provide unique features within the image. As illustrated in FIG. 3B, for example, alignment identifiers 450a, 452a, 454a, 456a, 458a, 460a and 462a define associated alignment regions 450b, 452b, 454b, 456b, 458b, 460b and 462b. Each of the alignment regions 450b, 452b, 454b, 456b, and 458b provides unique text which will be repeated for each German identification card using this format. For example, each German identification card of this type or form includes the words "BUNDESREPUBLIK DEUTSCHLAND Personalausweis." For each identification card, these words are provided in the upper left hand corner with the word "Personalausweis" positioned under the words "BUNDESREPUBLIK DEUTSCHLAND." Further, the words "Name", "Geburtstag", and "Gultig bis" are vertically aligned in approximately the center of the identification card. Alignment regions 460b and 462b provide unique portions of the water mark which are repeated on all documents of this type (i.e., on German identification cards using this format). Although not required, preferably and for best results, the selected alignment regions are not grouped together but rather are spaced apart from each other and selected from all portions of the image, i.e., preferably the alignment regions will span the image. For example as illustrated in FIG. 3B, region 450b is generally provided at the upper left portion of the image, regions 452b, 454b and 456b are generally provided in the center of the image, region 458b is generally provided near the bottom of the image; and region 460b is generally provided at the upper right portion of the image. After selection of the alignment regions of the template image, the alignment regions are processed.

Processing of the alignment regions of the template is illustrated in FIG. 1A. Step 208 provides for calculating the gradients associated with pixels in the alignment regions of the template image. Generally speaking, a gradient defines a change in value between the pixel and nearby pixels. A value may be for example, an RGB value or an HSV value. A gradient, may be for example, the second-order partial derivatives of the changes in the pixel values provided in the form of a Hessian matrix. Gradients can be determined using a SURF Feature Detector, for example. Gradients may be determined for each pixel within the alignment region. Alternatively, gradients may be determined for a portion (e.g. a random sampling) of the pixels within the alignment region.

Figure 3C:
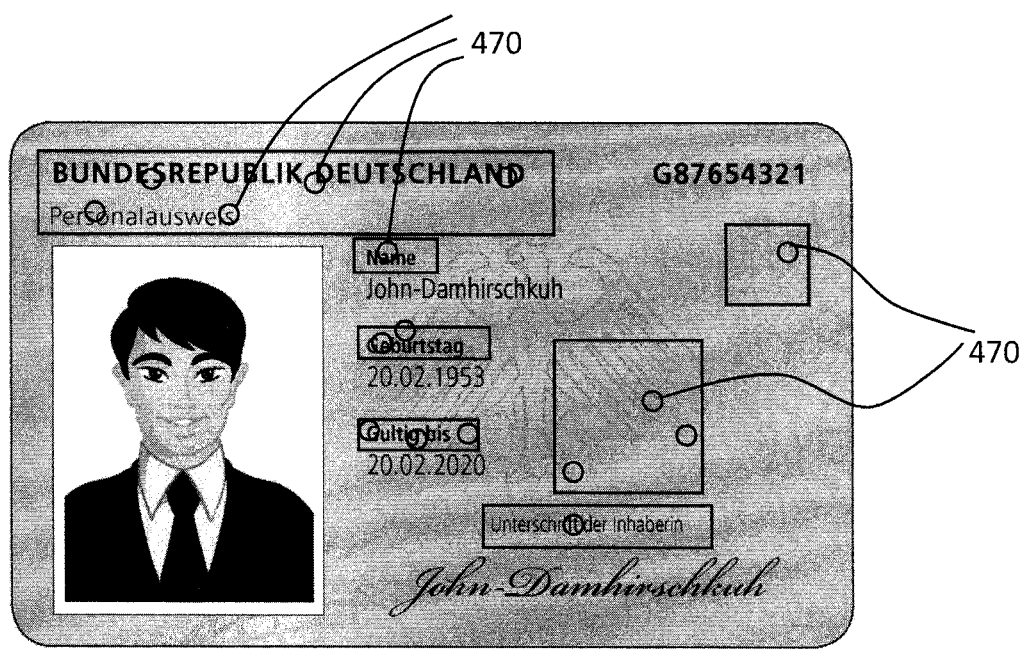
FIG. 3C illustrates a portion of a user interface for displaying the location of key points using key point identifiers.

Once the template gradients have been calculated, at step 210 the template key points are selected based upon the template key point criteria. Different criteria may be used for selection of the template key points. For example, those pixels having the largest gradients may be selected as template key points. Alternatively, all pixels having gradients over a particular threshold may be selected as template key points. The criteria for selecting template key points may vary based upon the characteristics of the image. For example, if the template image includes many pixels having significant color variation, a higher threshold gradient may be required for selection of a pixel as a template key point. In contrast, a lower threshold gradient may be required when the template image is relatively uniform in color. The user interface may be configured to display the selected template key points on the template image. A portion of a simplified version of a user interface configured to display the selected template key points is illustrated in FIG. 3C. Key point identifiers in the shape of circles 470, are utilized to display the location of the template key points. For the sake of clarity only a small portion of the key point identifiers is illustrated. In addition, the size of the key point identifiers has been enlarged for purposes of illustration.

Next, at step 212 a feature vector is calculated at each template key point. The feature vectors may be calculated utilizing SURF or SIFT, for example.

As will be discussed below, the meaningful template vectors are utilized to match the query image to a template image. Those template feature vectors having unique characteristics, therefore, provide a more appropriate basis upon which a match can be made. Template feature vector clusters are groups of feature vectors which have been identified as having similar characteristics. A KD tree may be utilized, for example, to identify template feature vector clusters. At step 214, template feature vector clusters are identified and discarded, and the remaining template feature vectors provide a set of meaningful template vectors.

With processing of the template image completed, at step 216 the characteristics of the template image are stored in a parameters file. The parameters file includes, for example, an identifier/label for the document type associated with the template image, the location of the processing identifiers, the location of alignment identifiers, template key point criteria (e.g. a template gradient threshold used to select template key points), and the set of meaningful template vectors associated with the alignment regions. The parameters file may further include additional information regarding the document type/form which will aid in the extraction of information from the form document. For example, the parameters file may include the language associated with the document type or identification of the type of information found in each processing region (e.g. text, digits, dates). The user interface includes prompts displayed so as to prompt the user for the parameters file information. The user interface may further present default values to be stored in the parameters file and adjusted by the user as desired. For example, the user interface may present the user with a default gradient threshold to be used for template key point criteria while allowing the user to select the default gradient threshold or set a new gradient threshold. As will be described below, the user may adjust the thresholds and other information provided in the parameters file to alter the results achieved during the matching process.

Steps 202-216 are repeated for each template image to be processed.

Steps 220-236 illustrate the steps associated with processing the query image. At step 220 a query image is identified. The query image may be any image that is to be compared to a template image(s) for the purpose of determining whether the query image is associated with the same document type/form as is associated with the template image.

At step 230, gradients are determined for pixels in the query image. Although the determination of a gradient for each pixel of the query image will provide more accurate results, it is noted that it is not necessary to calculate the gradient for each pixel of the query image. For example, gradients may be calculated for a random sampling of the query image pixels. Unlike the calculation of gradients for the template image which occurs only for pixels associated with the alignment regions, gradients for the query image are calculated across the entire query image. One reason for calculating gradients for pixels across the entire query image is that the orientation and nature of the query image may be unknown. As a result, the location of alignment regions of the query image similar to the location of alignment regions of the template image may not be readily identifiable. As discussed above with respect to the template image, each gradient may be for example, the second-order partial derivatives in the form of the Hessian matrix. Gradients can be determined using the Surf Feature Detector, for example.

Once the gradients for the query image have been determined, at step 232 the query key points are selected based upon the query key point criteria. As with the template image, different methods may be used for selection of the query key points. For example, those pixels having the largest gradients may be selected as key points. Alternatively, all pixels having gradients over a particular threshold may be selected as key points. The query key point criteria may vary based upon the characteristics of the query image. For example, if the query image includes many pixels having significant color variation, a higher threshold gradient may be required for selection of a pixel as a key point. In contrast, a lower threshold gradient may be required when the query image is relatively uniform in color. The user interface may be configured to display the selected query key points on the query image. Key point identifiers in the shape of circles may be utilized to display the location of the template key points. The display of the key points provides the user the ability to quickly assess the location of key points. For example, a user can quickly observe whether key points have been identified across the image as opposed to a particular portion of the image.

Next, at step 234 a query feature vector is calculated at each query key point. For example, similar to the feature vectors of the template image, the feature vectors of the query image may be calculated utilizing SURF or SIFT.

Next, at step 236, query feature vector clusters of the query image are identified and discarded, and the remaining query feature vectors define a set of meaningful query vectors. These meaningful feature vectors represent feature vectors having unique characteristics and therefore provide more meaningful matches between the query image and the template image. Similar to the identification of template feature vector clusters, a KD tree may be utilized to identify query feature vector clusters associated with the query image.

Figure 4A:
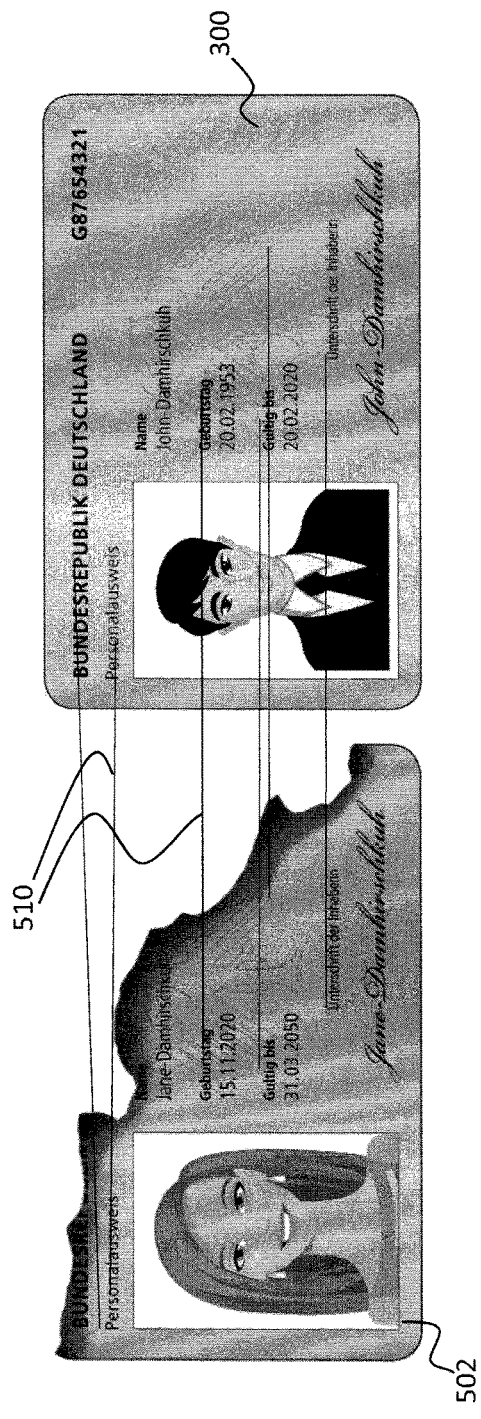
FIG. 4A illustrates a portion of the user interface illustrating the step of pairing vectors of the template image of FIG. 2A with the vectors of a damaged partial query image.
Figure 4B:
FIG. 4B illustrates a portion of the user interface illustrating the step of pairing vectors of the template image of FIG. 2B with the vectors of a poor quality query image.
Figure 4C:
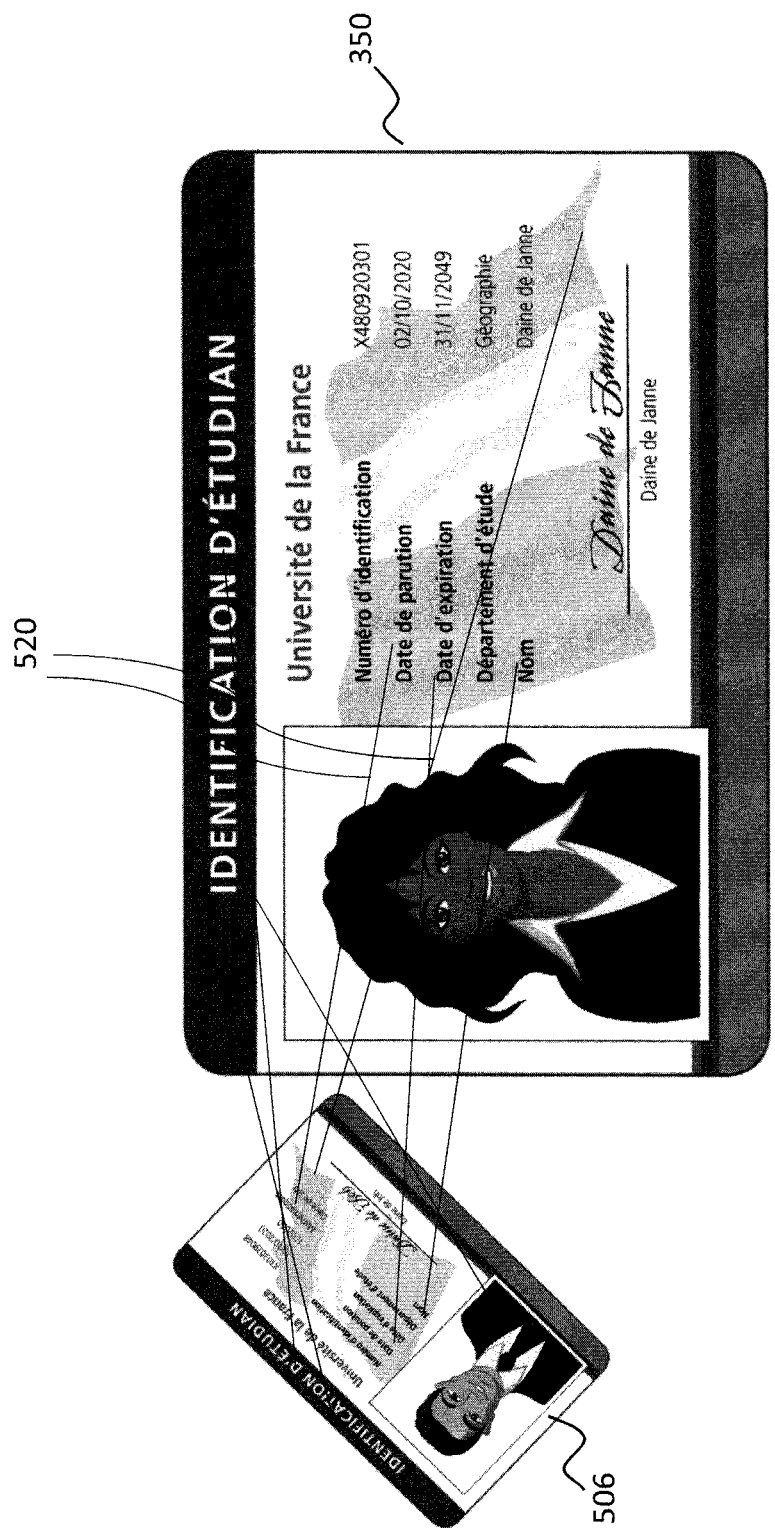
FIG. 4C illustrates a portion of the user interface illustrating the step of pairing the vectors of the temple image of FIG. 2B with the vectors of a rotated and much smaller query image.

Steps 238-258 of FIG. 1B provide a process for matching a query image with a template image and determining whether the match is sufficient in order to extract information from the query image. Query images 502, 504 and 506 are illustrated in FIG. 4A-4C. In some instances, the form document associated with the query image is known and a template image associated with the form document has been processed as described in connection with FIG. 1A. In these instances, the parameters file to be used for matching query and template images is known. In other instances, the user will not know what form document is associated with the query image. In these instances, a comparison(s) will need to be made in an attempt to match the query image to a template image using the available parameters files until a match is made or until all parameters files have been assessed. Thus, the present invention does not require that the template image associated with the query images is known a-priori. For example, if drivers' licenses for each state in the United States, various employee identification cards, insurance cards, etc. have been processed and parameters files have been created, when the selected query image is a Maryland driver's license, it is not necessary that the query image be manually identified as a Maryland driver's license or even that the query image be identified as a driver's license in order to perform the matching process. Specifically, with respect to the examples illustrated, query images 504 and 506 may, for example, be readily identified as French student identification cards and the user may know that the template image 350 and its related parameters file will be used for determining a match between the query and template image. The identification of query image 502 as a German identification card may, however, not be known. In this case, a search of the parameters files must be conducted in order to identify which parameters file, if any, is related to the template image which matches the query image. As illustrated in FIG. 1B, at step 238 it is determined whether a parameters file associated with the query image is known.

If the parameters file associated with the query image is known, at step 240 the parameters file for the associated template image is retrieved. If the template image associated with the query image is not known, at step 242 a first parameters file is selected.

At step 244, the set of meaningful template vectors provided by the selected parameters file is compared to the set of meaningful query vectors. Comparison of the vectors is provided to pair similar template and query vectors. For example, FLANN (Fast Library for Approximate Nearest Neighbors) may be used to pair the vectors. As a result of the pairing, a set of paired vectors is provided. FIG. 4A-4C illustrate a portion of the user interface which displays paired feature vectors. The user interface displays the template and query images undergoing comparison in a side-by-side manner. FIG. 4A illustrates a comparison of the template image 300 of FIG. 2A with query image 502. Once the pairing of the template and query vectors has occurred, as illustrated in FIG. 4A, the user interface utilizes guidelines 510 to denote the pairing of feature vectors. Specifically, each guideline 510 extends between a key point location of the template image and a key point location of the query image to illustrate the pairing of feature vectors associated with those key points. For the sake of clarity, only a small portion of the paired feature vectors is illustrated in FIG. 4A. In addition, for the sake of clarity, the key point identifiers associated with the key points are not illustrated in FIG. 4A. The guidelines 510 provide the user with a visual representation of the pairing and the ability to quickly understand the nature of the pairing which has occurred. In this case, portions of the identification card were burned and are missing from the query image 502. As illustrated, however, despite the missing portions from the image, several paired vectors have been identified. FIG. 4B illustrates a comparison of the template image 350 of FIG. 2B with a query image 504. In this case the image 504 relates to a water damaged identification card. Several paired vectors have been identified and are indicated by the guidelines 512. A majority of the paired vectors indicate matches at appropriate portions of the images. It is noted however, that a few guidelines, e.g. 512a, 512b incorrectly match a portion of the individual's jacket in the query image 504 with the title bar of the template image 350. As discussed below, these incorrect matches do not prevent the extraction of data from the query image.

An advantage provided by the present invention is the ability to match template images to query images even in the event the query image is rotated, skewed, or has been enlarged or reduced relative to its original size. FIG. 4C illustrates a query image 506 which is rotated relative to the template image 350 and is smaller than the template image 350. FIG. 4C illustrates the display of the paired vectors provided by the user interface using guidelines 520 to illustrate the pairing of the meaningful template and query vectors. Despite the rotation of the query image, a significant number of paired vectors were identified, however, for the sake of clarity a small portion of the paired vectors is illustrated in FIG. 4C.

At step 246 the set of paired vectors is evaluated to determine whether a sufficient number of paired vectors is provided to meet a paired vector threshold. A default paired vector threshold may be provided and adjusted as described below if needed. If the paired vector threshold is not met, this is an indication that either the query image does not match the template image (i.e., the query image is not associated with the same type of form document as the template document is associated with) or the quality of the image is insufficient to achieve a match. In the event the paired vector threshold is not met and the parameters file associated with the query image is known, the process is terminated. Alternatively, if desired adjustments may be made to the parameters file in order to achieve desired matches. For example, if the query images are damaged and the selected alignment regions are not present on the damaged image, the parameters file may be updated to select new alignment regions. In the event the paired vector threshold is not met and the parameters file associated with the query image was unknown, the process returns to step 242 where a next parameters file is selected relating to another type of document. At step 244 the meaningful query vectors are compared to the meaningful template vectors of the next form document and the process proceeds to step 246 where it is determined whether the paired vector threshold is met for the newly selected parameters file. In each of the examples illustrated in FIGS. 4A-4C, the paired vector threshold was met. If the paired vector threshold has been reached, this is an indication that the template image and the query image are a possible match and the process continues at step 248.

At step 248, a homography between the template image and the query image is identified. The homography may be calculated using the RANSAC algorithm, for example. The homography, H, between the query image and the template image is represented as follows:

$$s_i \begin{bmatrix} x'_i \\ y'_i \\ 1 \end{bmatrix} \sim H \begin{bmatrix} x_i \\ y_i \\ 1 \end{bmatrix};$$

where $s_i$ represents a scaling parameter;

$$\begin{bmatrix} x'_i \\ y'_i \\ 1 \end{bmatrix}$$

represents locations on the query image; and $$\begin{bmatrix} x_i \\ y_i \\ 1 \end{bmatrix}$$

represents locations on the template image.

The 2D homography matrix is defined as:

$$H = \begin{pmatrix} R11 & R12 & T1 \\ R21 & R22 & T2 \\ P & P & 1 \end{pmatrix}$$

where R is a rotation matrix, defined as $$R = \begin{pmatrix} R11 & R12 \\ R21 & R22 \end{pmatrix},$$

T is a translation matrix defined as $$T = \begin{pmatrix} T1 \\ T2 \end{pmatrix},$$

and P is a perspective warp.

Next, at step 250, the determinant of the homography calculated. The value of the determinant provides an indication of the quality of alignment, e.g. the determinant will often be near zero for very poor matches between the template image and the query image.

Inlier key points are those key points associated with the paired feature vectors which provide the best estimate for the construction of the homography matrix; i.e., the points of the query image and the template image provide the best solutions when solving for the homography matrix (H). Each key point associated with a paired feature vector is evaluated to determine whether the key point is an inlier key point. The RANSAC algorithm, for example, may be used to determine whether the key point is an inlier key point. Alternatively, the determination of a key point as an inlier key point may be made, for example, by specifying a distance function and threshold. Referring to FIG. 4B, for example, the key points associated with paired vectors 512*a*, 512*b* are not likely to be identified as inliers. At step 252, using the homography (H), the number of inlier key points are calculated. For example, a by-product of the RANSAC algorithm, may be used to determine the number of inliers.

Next, at step 254 an evaluation is made as to whether the homography is sufficient to meet the homography thresholds. The homography thresholds include a determinant threshold and an inlier key point threshold. The determinant threshold may be evaluated, for example, by calculating a log scale factor of the determinant (i.e., 10*log 10(abs(determinant(H)). In the examples illustrated in FIGS. 4A-4C, the determinant threshold was set to −10 db and the determinant threshold was found to be met. In the examples illustrated in FIGS. 4A-4C, the inlier key point threshold was set to 7. In each of the examples illustrated in FIGS. 4A-4C the number of inlier key points was found to be equal to or greater than 7 and the inlier key point threshold was found to be met. It is noted that the homography thresholds, i.e. the determinant threshold and the inlier key point threshold may be adjusted based upon the results obtained in the matching process. The thresholds should be set sufficiently high to ensure that information can be retrieved from the processing regions. Furthermore, similar measures of homography quality, such as median re-projection error, may be used in lieu of the determinant and key point thresholds.

At step 254, a match determination for the query image is made. Specifically, it is determined whether the homography thresholds are met. If the homography thresholds are met, the query image is determined to be a match to the template image. If the homography thresholds are not met, the query image is not determined to be a match to the template image. If the query image is determined to be a match to the template image, the process continues at step 260. At step 254, if the homography thresholds are not met and the query and template images are not identified as a match, at step 256, it is determined whether processing adjustments as described below are desired. If at step 256, it is determined that processing adjustment are not desired, and additional parameters files are available for comparison to the query image, the process returns to step 242 where another parameters file is selected.

At step 256, if it is determined that adjustments are desired, the user proceeds to step 258 to make the desired adjustments. The processing adjustment may include for example, template adjustments, query adjustments or matching adjustments.

Template adjustments include adjustments to the processing of the template image. For example, the template key point criteria may be adjusted. More specifically, the threshold gradient value for determining which points are key points may be adjusted. Template adjustments may also include the identification of alignment or processing regions. For example, if it is known that a portion(s) of the query image(s) are missing, the parameters file may be adjusted to exclude alignment or processing regions relating to the missing portions of the image. For example, alignment region 460*b* (See FIG. 3B) and processing region 402*b* (See FIG. 3A) are missing from the image 502 illustrated in FIG. 4A. In order to improve the efficiency of processing the images, these regions can therefore be eliminated from the template processing. Depending upon the particular template adjustments provided, steps 204-214 may need to be repeated.

Query adjustment(s) may include, for example, the sampling method for selecting pixels for the calculation of gradients may be adjusted. Alternatively the query key point criteria may be adjusted. Depending upon the query adjustments provided, steps 230-236 may need to be repeated.

Matching adjustments may include, for example, adjustment to the paired vector threshold. For example, in the event the paired vector threshold is met, however the results indicate that the query image is not of the same type as the template image associated with the selected parameters file, the paired vector threshold could be increased. Alternatively, in the event the paired vector threshold was not met at step 246 and it is believed that the paired vector threshold was set too high causing possible matches to be eliminated, the paired vector threshold may be decreased. Matching adjustments may also include for example, adjustments to the homography thresholds, i.e. adjustment to the determinant threshold or the inlier key point threshold. Depending upon the matching adjustments needed, steps 246-256 may need to be repeated.

Once it has been determined that the homography thresholds have been met at step 254, the process proceeds to steps 260-268 illustrated in FIG. 1C. FIG. 1C illustrates the steps utilized to extract information from the query image.

Figure 5:
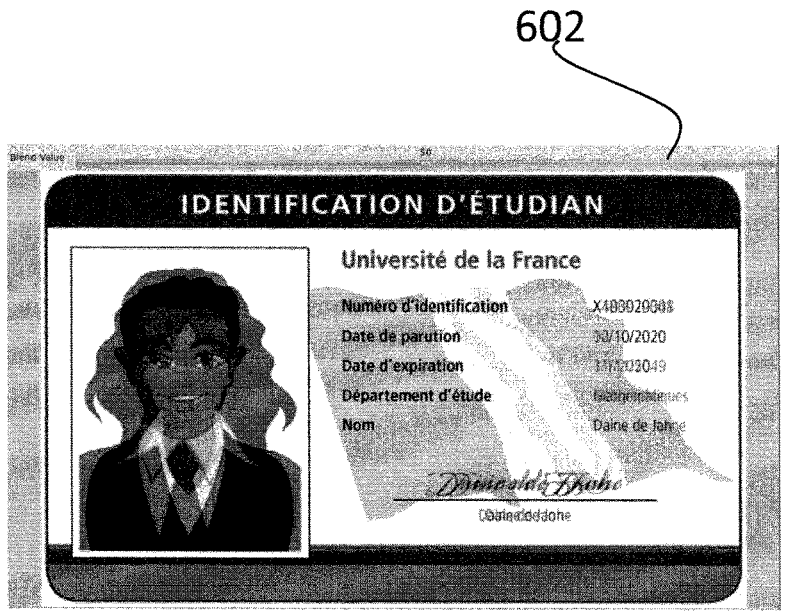
FIG. 5 illustrates a portion of the user interface demonstrating an overlay of the matched template and query images of FIG. 4B.
Figure 6:
FIG. 6 illustrates a portion of the user interface demonstrating an overlay of the matched template and query images of FIG. 4C.

At step 260, the homography is utilized to align the query image with the template image. Because the scale of the query image may not match the scale of the template image, this step of alignment includes scaling of the query image to match the scale of the template image. In order to assist the user in evaluating the comparison of the images, the user interface may, if desired, display the aligned and scaled template and query images in an overlay view. FIG. 5, for example, illustrates the overlay view 600 provided when the query image 504 was compared to the template image 350. Both portions of the template image 350 and portions of the query image 504 are visible in this overlay view. FIG. 6 illustrates the overlay view 700 provided when the rotated query image of FIG. 4C was compared to the template image 350. As illustrated in FIGS. 5 and 6 the user interface provides an interactive overlay bar 602, 702 which allows the user to select the degree to which the template image or the query image is visible. FIGS. 5 and 6 illustrate the user interface with the adjustment of the overlay bar 602, 702 set to fifty percent, indicating each of the template and query images are equally visible. This overlay view allows the user to visualize the degree to which alignment between the images is achieved. It is noted that the degree of alignment achieved using the un-rotated query image 504 is the same as the alignment achieved using the rotated query image 506. It is further noted, that no manual adjustment of the rotated query image was required to achieve this alignment.

With alignment of the template and query images achieved, the process of extracting information from the query image may begin. At step 262, utilizing the processing region location information from the parameters file, the processing region(s) of the query image are identified.

At step 264, for each processing region identified, the appropriate processing steps are performed. The processing steps to be performed for each processing region are identified in the parameters file. The processing steps associated with each processing region may vary depending upon the type of information to be extracted from the processing region. For example, processing steps for regions containing text may include the following steps: (1) conversion of RGB to HSV; (2) extraction of the value (V) channel; (3) erosion of the image; (4) dilation of the image; and (5) binarization. The processing steps for regions containing bar codes may include the following steps, for example: (1) conversion of RGB to HSV; (2) extraction of the value channel; (3) erosion of the image; (4) dilation of the image; and (5) binarization. The processing step for regions containing logos may include the following steps, for example: (1) conversion of RGB to HSV; (2) extraction of the value channel; (3) erosion of the image; (4) dilation of the image; and (5) binarization. The processing step for regions containing images of faces may include the following steps: (1) removal of the background surrounding the individuals face; and (2) other enhancements that would improve a face recognition algorithm.

Although examples of processing steps for different types of processing regions are described above, it is to be understood that a particular series of steps is not required and further it is to be understood that different steps or sequencing of steps may provide better results depending upon the features of the template image. In addition, various methods may be used to achieve the processing steps. For example, various methods may be used to achieve erosion, dilation and binarization.

For each processing region, the user interface of the present invention is configured to allow the user to view the effect of each processing step. For example, the processing region may be displayed after erosion, after dilation, and after binarization. By displaying the effect of each processing steps, the user may gain insight as to whether adjustment is needed to the processing steps. For example, a user may be able to select a different binarization process or chose a different color space. If the user is not interested in viewing the effect of the processing steps, a selection may be made by the user, via the user interface, to eliminate these displays.

At step 266 a processing region image is stored for each processing region of the query image. Each processing region image may, if desired, be examined to determine if adjustments in processing would improve the images provided. For example, if the processing region image only includes a portion of text associated with a processing region of the query image, the position of the processing region associated with the template image may need to be adjusted. Alternatively, the processing steps used to produce the processing region image may need to be adjusted. Because different processing steps may be associated with each processing regions, the processing steps performed may be adjusted on a region-by-region basis.

At step 268 information from each processing region image is extracted. The process of extracting information from the image will vary depending upon the nature of the processing region associated with the image. For example, if the processing region is associated with a text field, the extraction steps may include: (1) selecting an OCR engine based upon the language of the text; (2) selecting a whitelist; (3) providing the image to the OCR engine to convert the image to text; and (4) translation. The language associated with the text of the processing regions may be indicated in the parameters file. By selecting an OCR engine best suited for the indicated language, the OCR results may be improved. For example, the certain OCR engines are known to provide improved accuracy when converting images of Chinese characters to text. Other OCR engines which may be utilized include for example, Tesseract. The parameters file may include a whitelist to be applied during the process of converting the image to text. The whitelist provides a limited number of characters or words which the OCR engine may use for the resulting conversion. For example, if the processing region is expected to include only numbers (e.g. a field related to "telephone number"), a whitelist including only numbers may be associated with processing region. When the OCR engine is applied, conversion of the numbers-only processing region is restricted to an output including only numbers.

Once the image has been converted to text, if desired, the text may be translated to a destination language. For example, if the OCR step results in textual information in a language unfamiliar to the reviewer, the text may be translated to the reviewer's native language to aid the reviewer's understanding of the information extracted. The user interface may be configured, for example, to allow the user to select a destination language for translation and the processing steps may be adjusted in accordance with the user's selection to provide the extracted query image information to the user in the desired destination language. It is noted, however, that translation of certain fields, such as for example, an address field, often does not provide useful results. Thus, the parameters file may provide for the translation of certain textual fields while other textual fields remain untranslated.

If the processing region contains a bar code, the extraction steps may include, for example: (1) decoding of the bar code to provide text and images encoded in the bar code; (2) comparison of the decoded text to other OCR text extracted from the image; and (3) translation of the text. In the case of an identification card, for example, the bar code may include name, date of birth, address, blood type, photo, iris, and/or fingerprint. This information may serve to supplement the text and images available on the card, validate the card, or offer alternative means of acquiring the card holder's data. For example, if the name of the card holder is recovered from a text field and the name of the card holder is recovered from a decoded bar code field, the two extracted names can be compared to determine if a match exists. If the extracted names do not match, the information can be flagged and further investigation may be made to determine whether the identification card is valid. If the processing region contains a logo, the extraction steps may include, for example, saving the image to be used for later detection. If the processing region contains an image of a face, the extraction steps may include, for example, submission of the image to a facial recognition database.

Although the steps of the method illustrated in FIGS. 1A-1C have been described in a particular order, it is to be understood that in many cases, the order of many of the steps may be changed. For example, the step 204 of identifying processing regions of a template image has been described as occurring prior to step 206 of selecting alignment regions. These steps do not need to be ordered in this manner. If desired, the selection of the alignment regions may occur prior to the identification of the processing regions, for example.

It is noted that the matching process illustrated in FIG. 1B may be completely automated, i.e., these steps do not require any input from the user. Specifically, neither the paired vector threshold evaluation nor the homography threshold evaluation require user intervention. The user may simply rely on the determination of a match based upon the thresholds provided in the parameters file. Thus, although the user interface may be utilized to display paired vectors, as illustrated in FIG. 4A-4C, no such display is required to determine whether template and query images match. Similarly, although an overlay may be utilized, as illustrated in FIGS. 5 and 6 to assist the user in visualizing the sufficiency of the match, no such visualization is required. Automation of the matching process allows the query image to be efficiently compared to numerous template images.

The invention further provides the ability to make adjustments to the parameters file in order to improve the accuracy of the matching process. For example, the parameters file may initially include default thresholds. A test query image (s) may be utilized and processed to determine whether accurate matches or mismatches are determined. If a match or mismatch is incorrectly detected, adjustment(s) may be made. For example, the gradient thresholds and/or the paired vector thresholds may be adjusted.

Once a match is obtained, the invention provides for the automated extraction of the desired information. The type of information to be extracted is automatically identified and processing steps are automatically tailored depending upon the type of information to be extracted. By tailoring these processing steps, a wide variety of types of information may accurately extracted (e.g., text, bar codes, QR codes, faces, signature, logos, diagrams, etc.).

The invention allows for the retrieval of information from query images of poor quality or even partial query images. In the event the query image is rotated, skewed or off-angle, alignment of the images is provided without a need for the user to "manually" align the template and query images.

The present inventions allows for processing and matching of images without restriction of the characteristics of the image. For example, the template and query images do not need to include horizontal and vertical lines.

The present invention provides for the creation of a parameters file using a single template image. Thus, there is no need to obtain a plurality of template images of the same type in order to match the template and query images rather, only a single template image is required.

While embodiments of the present invention are shown and described, it is envisioned that those skilled in the art may devise various modifications of the present invention without departing from the spirit and scope of the appended claims.

The invention claimed is:

1. A method of matching a query image to a template image including the steps of:
   identifying a parameters file associated with a template image, the parameters file including, the location of a processing region of the template image, and a set of meaningful template vectors associated with alignment regions of the template image;
   identifying a query image;
   identifying a set of meaningful query vectors;
   comparing the meaningful template vectors to the meaningful query vectors to provide a set of paired vectors;
   identifying a paired vector threshold;
   determining whether said set of paired vectors meets said paired vector threshold;
   using said set of paired vectors to identify a homography between the template image and the query image;
   setting a homography threshold;
   determining whether the homography threshold is met; and
   making a match determination of said query image based upon the determination of whether said homography threshold is met.

2. The method of claim 1, wherein said step of setting a homography threshold further includes the steps of:
   setting a determinant threshold;
   calculating a determinant of said homography; and
   determining whether the calculated determinant meets said determinant threshold.

3. The method of claim 2, further including the steps of:
   upon determining that said determinant threshold has not been met, selecting a new parameters file associated with a new template image including the location of a processing region of the new template image and a set of new meaningful template vectors;
   comparing the new set of meaningful template vectors to the meaningful query vectors to provide a new set of paired vectors; and
   determining whether said new set of paired vectors meets said paired vector threshold.

4. The method of claim 1, wherein said step of setting a homography threshold further includes the steps of:
   using said homography to determine a number of inlier key points;
   setting an inlier key point threshold; and
   determining whether said determined number of inlier key points meets said inlier key point threshold.

5. The method of claim 1, wherein the set of meaningful template vectors are provided by:
   identifying template keypoint criteria;
   selecting the location of an alignment identifier to define an alignment region;
   for a plurality of pixels in the alignment region, calculating template gradients;
   using said calculated template gradients, identifying template key points based upon said template key point criteria;
   for each identified template key point, calculating a template feature vector; and identifying and discarding clusters of template feature vectors, to provide the set of meaningful template vectors.

6. The method of claim 1, wherein the set of meaningful query vectors are provided by:
   identifying query keypoint criteria;
   calculating query gradients for pixels of the query image;
   selecting query key points based upon said query key point criteria;
   for each query key point, calculating a query feature vector; and
   identifying and discarding clusters of query vectors to provide the set of meaningful query vectors.

7. The method of claim 5, further including the steps of:
   adjusting said template key point criteria to provide a new template key point criteria;
   selecting new template key points based upon said new template key point criteria;
   calculating a new set of template feature vectors;
   identifying and discarding clusters from said new set of feature vectors to provide a new set of meaningful template vectors.

8. The method of claim 6, further including the steps of:
   adjusting said query key point criteria to provide a new query key point criteria;
   selecting new query key points based upon said new query key point criteria;
   for each new query key point, calculating a new query feature vector; and
   identifying and discarding clusters of new query vectors to provide a new set of meaningful query vectors.

9. The method of claim 1, wherein said match determination results in a determination that the query image does not match the template image, the method further includes the step of adjusting said paired vector threshold.

10. The method of claim 1, wherein said match determination results in a determination that the query image does not match the template image, the method further includes the step of adjusting said homography threshold.

11. The method of claim 1, further including the step of identifying processing regions of the query image.

12. The method of claim 11, wherein said parameters file identifies the type of information associated with the processing region.

13. The method of claim 12, further including the step of extracting information from the processing region of the query image, wherein said method of extraction is based upon the type of information associated with the processing region.

14. The method of claim 12, wherein said processing region includes text, and said processing steps include:
   selecting an OCR engine based upon the language associated with the text of said processing region;
   utilizing said selected OCR engine for converting said processing region image to text.

15. The method of claim 12, wherein said processing region includes text, and said processing, steps include:
   identifying a whitelist associated with said processing region;
   restricting conversion of said image to text based upon said whitelist.

16. The method of claim 12, wherein said processing region includes text, further including the steps of:
   identifying a destination language associated with said processing regions; and
   translating said text to a destination language.

17. The method of claim 1, further including the step of adjusting the location of said processing region.

18. The method of claim 1, further including the step of providing an overlay view of said matching template and query images.

19. Method of matching a query image to a template image including the steps of:
   identifying a template image;
   identifying an alignment region of said template image;
   calculating the template gradients of pixels within the alignment region;
   setting template key point criteria;
   determining template key points based upon said template key point criteria;
   for each template key point, calculating a template feature vector to provide a plurality of template feature vectors;
   identifying a set of meaningful template vectors from said plurality of feature vectors and including said set of meaningful template vectors in a parameters file;
   identifying a query image;
   calculating query gradients of the query image pixels;
   setting query key point criteria;
   selecting query key points based upon said query key point criteria;
   for each query key point, calculating a query feature vector to provide a plurality of query feature vectors;
   identifying a set of meaningful query vectors from said plurality of query feature vectors;
   comparing said meaningful template vectors to said meaningful query vectors to provide a set of paired vectors;
   identifying a paired vector threshold; and
   determining whether said set of paired vectors meets said paired vector threshold.

20. The method of claim 19, wherein upon determining that said paired vector threshold is met, further including the steps of:
   using said set of paired vectors to identify a homography between the template image and the query image;
   calculating a determinant of the homography;
   setting a determinant threshold; and
   determining whether said calculated determinant meets said determinant threshold.

21. The method of claim 20, further including the steps of:
   using said homography to determine the number of inlier key points;
   setting an inlier key point threshold; and
   determining whether the number of inlier key points meets said inlier key point threshold.

22. The method of claim 21, further including the steps of:
   identifying a processing region of the template image;
   identifying a processing region of said query image; and
   upon determining said paired vector threshold, said determinant threshold, and said inlier key point threshold have been met, extracting information from the processing region of said query image, wherein said extraction process is based upon the type of information provided in said processing region.

* * * * *